United States Patent
Wu et al.

(10) Patent No.: US 9,977,119 B2
(45) Date of Patent: May 22, 2018

(54) ROTATING OPTICAL RANGE FINDER

(71) Applicant: Arima Lasers Corp., Taoyuan (TW)

(72) Inventors: Ming-Cho Wu, Taoyuan (TW);
Ching-Hui Lin, Taipei (TW);
Ming-Hui Fang, Taoyuan (TW)

(73) Assignee: Arima Lasers Corp., Taoyuan (TW)

( * ) Notice: Subject to any disclaimer, the term of this patent is extended or adjusted under 35 U.S.C. 154(b) by 436 days.

(21) Appl. No.: 14/801,845

(22) Filed: Jul. 17, 2015

(65) Prior Publication Data
US 2016/0274221 A1 Sep. 22, 2016

(30) Foreign Application Priority Data
Mar. 20, 2015 (TW) ............................. 104204238 U

(51) Int. Cl.
| G01C 3/08 | (2006.01) |
| G01S 7/481 | (2006.01) |
| G01S 17/48 | (2006.01) |
| G01S 7/00 | (2006.01) |
| H02J 50/12 | (2016.01) |
| H02J 50/90 | (2016.01) |
| G01S 17/42 | (2006.01) |

(52) U.S. Cl.
CPC ............ *G01S 7/4817* (2013.01); *G01S 7/003* (2013.01); *G01S 17/48* (2013.01); *H02J 50/12* (2016.02); *H02J 50/90* (2016.02); *G01S 17/42* (2013.01)

(58) Field of Classification Search
CPC .......... G01S 7/4817; G01S 7/48; G01S 7/003; G01S 17/42; H02J 50/90; H02J 50/12
USPC ........................................... 356/4.01
See application file for complete search history.

(56) References Cited

U.S. PATENT DOCUMENTS

| 5,808,727 A * | 9/1998 | Katayama ............. G01S 7/4811 356/141.1 |
| 6,624,899 B1 | 9/2003 | Clark |
| 7,136,153 B2 | 11/2006 | Mori et al. |
| 8,996,172 B2 | 3/2015 | Shah et al. |
| 2016/0047901 A1 * | 2/2016 | Pacala ................... G01S 7/4815 356/5.01 |

* cited by examiner

*Primary Examiner* — Mark Hellner
(74) *Attorney, Agent, or Firm* — CKC & Partners Co., Ltd.

(57) ABSTRACT

A rotating optical range finder includes a stationary base, a rotating base, an optical sensor, a transmitting circuit, a receiving circuit, a first induction coil, and a second induction coil. The rotating base is disposed on the stationary base. The optical sensor is disposed in the rotating base. The transmitting circuit is disposed in the stationary base. The receiving circuit is disposed in the rotating base and electrically connected to the optical sensor. The first induction coil is disposed in the stationary base and electrically connected to the transmitting circuit. The second induction coil is disposed in the rotating base and electrically connected to the receiving circuit.

14 Claims, 4 Drawing Sheets

ROTATING OPTICAL RANGE FINDER

RELATED APPLICATIONS

This application claims priority to Taiwan Application Serial Number 104204238, filed Mar. 20, 2015, the entirety of which is herein incorporated by reference.

BACKGROUND

Technical Field

The present disclosure relates to an optical range finder, and more particularly, to a rotating optical range finder.

Description of Related Art

Distance measurement can be performed by direct measurement with a ruler or triangulation. Due to the limitation in length, the ruler is not suitable to measure a long distance. Triangulation is applicable to measure a long distance, but two persons are required in the measurement in that the observation mark is setup by a person, and the measuring instrument is controlled by another one. Further, it is troublesome to incur a larger error as conducting a longer distance measurement.

Recently, laser range finders are more and more popular for the distance measurement, and thus becomes one of the most important tools in distance measurement. Principally, the laser range finder sends a laser pulse of a narrow beam toward an object and measures the time taken by the pulse to be reflected from the object and back to the sender.

SUMMARY

This disclosure provides a rotating optical range finder in which the power transfer is achieved by wireless means with a first induction coil and a second induction coil. Therefore, no other electric power transfer component is needed to be disposed between the stationary base and the rotating base, such that the rotating base becomes easier to rotate and that the rotating optical range finder becomes more durable.

In one aspect of the disclosure, a rotating optical range finder is provided The rotating optical range finder includes a stationary base, a rotating base, an optical sensor, a transmitting circuit, a receiving circuit, a first induction coil, and a second induction coil. The rotating base is disposed on the stationary base. The optical sensor is disposed in the rotating base. The transmitting circuit is disposed in the stationary base. The receiving circuit is disposed in the rotating base and electrically connected to the optical sensor. The first induction coil is disposed in the stationary base and electrically connected to the transmitting circuit. The second induction coil is disposed in the rotating base and electrically connected to the receiving circuit.

In one or more specific embodiments, the first induction coil and the second induction coil perform wireless power transfer.

In one or more embodiments, the first induction coil and the second induction coil perform wireless power transfer by magnetically coupled resonance.

In one or more specific embodiments, the first induction coil and the second induction coil perform wireless signal transfer.

In one or more specific embodiments, the first induction coil and the second induction coil have the same symmetry axis.

In one or more specific embodiments, a ratio of dimensions of the first induction coil and the second induction coil is from about 1 to about 2.

In one or more specific embodiments, in the rotating optical range finder, there is a gap between the first induction coil and the second induction coil, and the gap is less than a radius of a smallest inscribed circle of the first induction coil or the second induction coil.

In one or more specific embodiments, the rotating optical range finder further includes a light-emitting component disposed in the stationary base. The optical sensor includes a first reflector, a second reflector, a light-receiving lens, and an image sensor. The first reflector is configured to receive and reflect a light emitted by the light-emitting component. The second reflector is configured to receive a light reflected by the first reflector and reflect the light reflected by the first reflector to an object. The light-receiving lens is configured to collect a light reflected by the object. The image sensor is configured to detect a light collected by the light-receiving lens.

In one or more specific embodiments, the light-emitting component is a collimated beam laser module.

In one or more specific embodiments, the rotating base has a first rotation axis, and the light-emitting component and the first reflector are disposed on the first rotation axis.

In one or more specific embodiments, the first reflector rotates about the first rotation axis, and the second reflector has a second rotation axis and is configured to perform an orientation adjustment by rotating about the second rotation axis.

In one or more specific embodiments, the first rotation axis is perpendicular to the second rotation axis.

In one or more specific embodiments, the rotating base has a first through hole, and the stationary base has a second through hole. The first through hole and the second through hole form a passage, such that a light emitted by the light-emitting component passes the passage and reaches the first reflector.

In one or more specific embodiments, the rotating optical range finder further includes a light-emitting component emitting a light to an object. The rotating optical range finder is disposed in the rotating base, and the optical sensor detects a light reflected by the object.

In one or more specific embodiments, the optical range finder further includes a plurality of optical data transmission devices in both the rotating base and the stationary base performing wireless signal transfer between the rotating base and the stationary base.

The rotating optical range finder is continuously rotating when the distances between the optical range finder and surroundings are measured. By performing wireless power transfer by the first induction coil and the second induction coil, no other electric power transfer component, such as a slip ring, is needed between the stationary base and the rotating base. Therefore, the weight of the rotating base is lessened, and the volume of the rotating base is reduced. Moreover, because there is no physical component disposed between the stationary base and the rotating base to perform electric power transfer, fractions between the stationary base and the rotating base is lessened. Therefore, the rotating base becomes easier to rotate.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
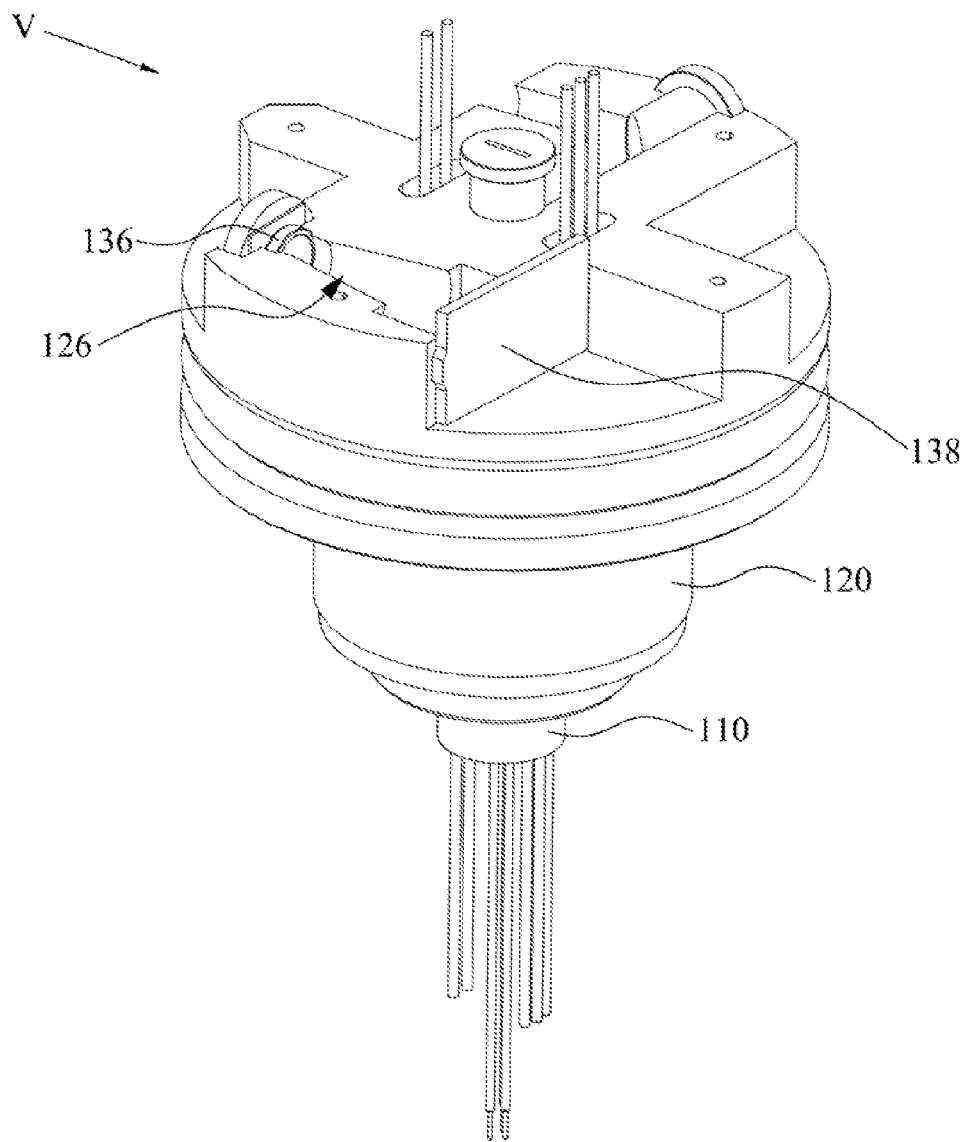
FIG. 1 is a schematic perspective view of a rotating optical range finder according to one embodiment of this invention.

FIG. 1 is a schematic perspective view of a rotating optical range finder 100 according to one embodiment of this invention. A rotating optical range finder 100 is provided. The rotating optical range finder 100 measures distances between the rotating optical range finder 100 and surroundings. The rotating optical range finder 100 can rotate all-round, so the rotating optical range finder 100 can measure distances between the rotating optical range finder 100 and the surroundings. The rotating optical range finder 100 can be used in a robot module. By measuring the distances between the rotating optical range finder 100 and the surroundings, the rotating optical range finder 100 provides the obstacle detection that is needed by the robot module.

Figure 2:
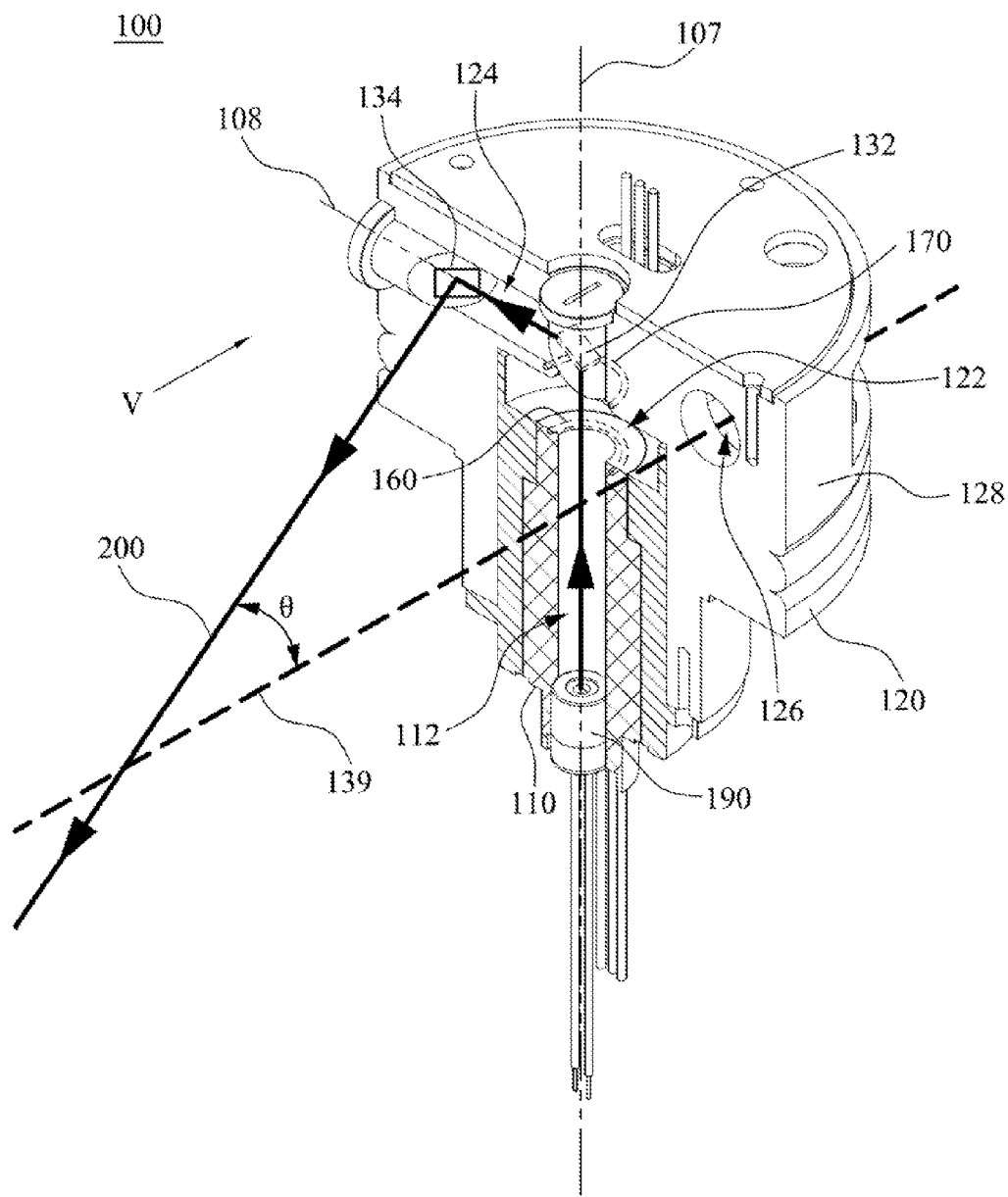
FIG. 2 is a schematic perspective cross-sectional view of the rotating optical range finder according to one embodiment of this invention.
Figure 3:
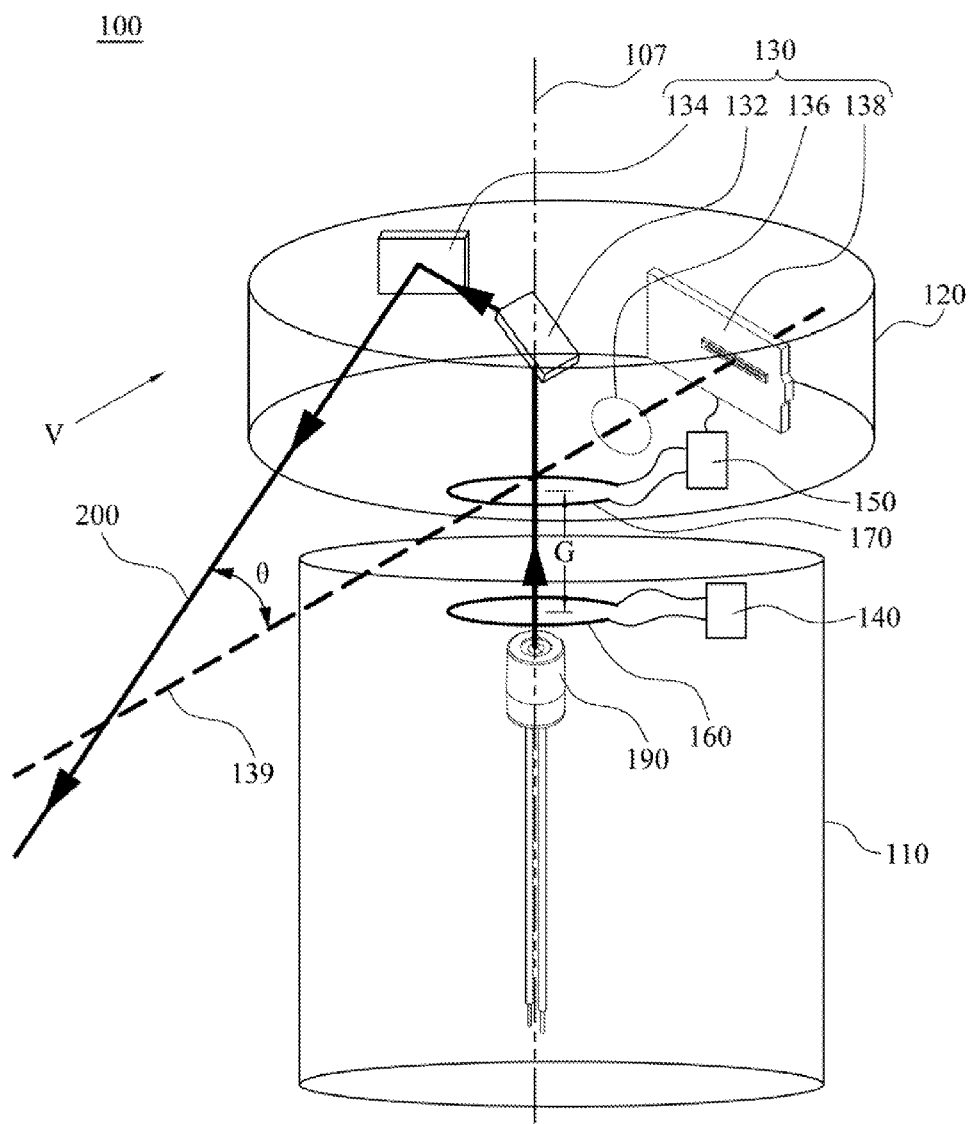
FIG. 3 is a schematic view of the rotating optical range finder according to one embodiment of this invention.

FIG. 2 is a schematic perspective cross-sectional view of the rotating optical range finder 100 according to one embodiment of this invention. FIG. 3 is a schematic view of the rotating optical range finder 100 according to one embodiment of this invention. FIGS. 2 and 3 are viewed from the perspective V of FIG. 1. As shown in FIGS. 2 and 3, the rotating optical range finder 100 includes a stationary base 110, a rotating base 120, an optical sensor 130, a transmitting circuit 140, a receiving circuit 150, a first induction coil 160, and a second induction coil 170. The rotating base 120 is disposed on the stationary base 110. The optical sensor 130 is disposed in the rotating base 120. The transmitting circuit 140 is disposed in the stationary base 110. The receiving circuit 150 is disposed in the rotating base 120 and electrically connected to the optical sensor 130. The first induction coil 160 is disposed in the stationary base 110 and electrically connected to the transmitting circuit 140. The second induction coil 170 is disposed in the rotating base 120 and electrically connected to the receiving circuit 150.

Specifically, the first induction coil 160 and the second induction coil 170 perform wireless power transfer. More specifically, the first induction coil 160 and the second induction coil 170 perform wireless power transfer by magnetically coupled resonance.

After a current is generated by the transmitting circuit 140, the current flows to the first induction coil 160, and the first induction coil 160 generates corresponding electromagnetic fields. Then, magnetically coupled resonance is generated between the first induction coil 160 and the second induction coil 170, such that the electric power in the first induction coil 160 is transmitted to the second induction coil 170 via the electromagnetic fields and that a current is generated in the second induction coil 170 as well, which will flows to the receiving circuit 150. Finally, the current flows to the optical sensor 130 to provide electric power needed by the optical sensor 130.

The rotating optical range finder 100 is continuously rotating when the distances between the optical range finder 100 and the surroundings are measured. Then, by performing wireless power transfer by the first induction coil 160 and the second induction coil 170, no other electric power transfer component, such as a slip ring, is needed to be disposed between the stationary base 110 and the rotating base 120. Therefore, the weight of the rotating base 120 is lessened, and the volume of the rotating base 120 is reduced. Moreover, because there is no physical component disposed between the stationary base 110 and the rotating base 120 to perform electric power transfer, fractions between the stationary base 110 and the rotating base 120 is lessened. Therefore, the rotating base 120 becomes easier to rotate.

In addition, if there are electric power transfer components, such as the brushes and the metal ring, disposed between the stationary base 110 and the rotating base 120, the brushes and the metal ring are pressed against each other when the rotating base 120 is rotating. Then, the brushes and the metal ring will be worn in the long term, and scraps will be generated, resulting in electrical leakage or short circuit. If the first induction coil 160 and the second induction coil 170 are adopted to perform wireless power transfer, the aforementioned problem can be avoided, such that the rotating optical range finder 100 becomes more durable.

Compared to other electric power transfer components such as the blushes and the metal ring, the costs of the first induction coil 160 and the second induction coil 170 are lower. Therefore, by using the first induction coil 160 and the second induction coil 170, the cost of the rotating optical range finder 100 is reduced.

The first induction coil 160 and the second induction coil 170 may perform wireless signal transfer as well. Specifically, when a current is generated in the transmitting circuit 140, the current carries signal as well. Then, the current flows to the first induction coil 160, and the first induction coil 160 generates the corresponding electromagnetic fields. Then, magnetically coupled resonance is generated between the first induction coil 160 and the second induction coil 170, such that the electric power in the first induction coil 160 is transmitted to the second induction coil 170 via the electromagnetic fields and that the current is generated in the second induction coil 170 as well. At the same time, because the amplitudes of the current in the first induction coil 160 changes with time, the corresponding electromagnetic fields change with time as well. Therefore, the magnitude of the current generated in the second induction coil 170 also changes with time, and the way the magnitude of the current generated in the first induction coil 160 changes with time is the same as the way the magnitude of the current generated in the second induction coil 170 changes with time. Accordingly, the signal carried by the current generated by the transmitting circuit 140 is transferred from the first induction coil 160 to the second induction coil 170 via the electromagnetic fields. The signal may be further sequentially transferred to the receiving circuit 150 and the optical sensor 130 from the second induction coil 170.

On the other hands, signals generated by the optical sensor 130 may also be sequentially transferred to the receiving circuit 150 and the second induction coil 170.

Then, the signals may be sequentially transferred to the first induction coil 160 and the transmitting circuit 140 via the electromagnetic fields.

In particular, the first induction coil 160 and the second induction coil 170 have the same symmetry axis 107, and a ratio of a radius of the first induction coil 160 to a radius of the second induction coil 170 is from about 1 to about 2. The first induction coil 160 and the second induction coil 170 have a gap G disposed therebetween, and the gap G is less than a radius of a smallest inscribed circle of the first induction coil 160 and the second induction coil 170.

For example, the shapes of the first induction coil 160 and the second induction coil 170 are circles, and the gap G is less than the radii of the first induction coil 160 and the second induction coil 170. The radii of the first induction coil 160 and the second induction coil 170 may be the same. Embodiments of this disclosure are not limited thereto. In other embodiments, the shapes of the first induction coil 160 and the second induction coil 170 may be other shapes, and the first induction coil 160 and the second induction coil 170 do not need to have the same symmetry axis. The radius of the first induction coil 160, the radius of the second induction coil 170, and the gap G between the first induction coil 160 and the second induction coil 170 do not need to correspond to each other as described above.

Figure 4:
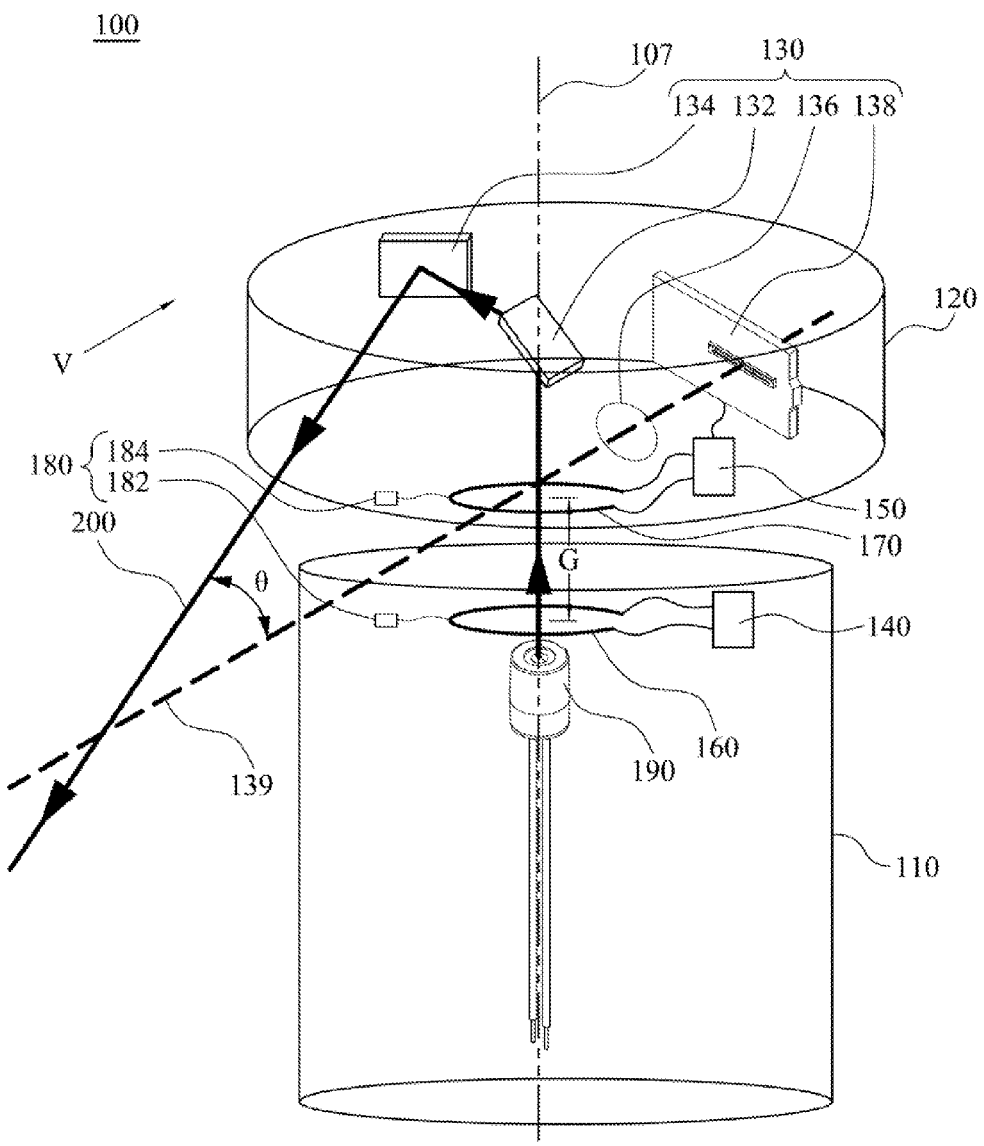
FIG. 4 is a schematic view of the rotating optical range finder according to another embodiment of this invention.

FIG. 4 is a schematic view of the rotating optical range finder 100 according to another embodiment of this invention. As shown in FIG. 4, the rotating optical range finder 100 further includes a wireless signal transmission module 180. The wireless signal transmission module 180 includes a first part 182 and the second part 184. The first part 182 is disposed in the stationary base 110 and electrically connected to the transmitting circuit 140. The second part 184 is disposed in the rotating base 120 and electrically connected to the receiving circuit 150. The wireless signal transmission module 180 performs wireless signal transfer.

Specifically, the first part 182 and the second part 184 of the wireless signal transmission module 180 may be antenna, which emit or receive radio wave signals. People having ordinary skill in the art can make proper modifications to the wireless signal transmission module 180 depending on the actual application. For example, in some embodiments, a plurality of optical data transmission devices such as IrDA (Infrared Data Association) module can be used as the wireless signal transmission module 180.

As shown in FIGS. 2 and 3, the rotating optical range finder 100 further includes a light-emitting component 190, and the light-emitting component 190 is disposed in the stationary base 110. The optical sensor 130 includes a first reflector 132, a second reflector 134, a light-receiving lens 136, and an image sensor 138. The first reflector 132 receives and reflects a light emitted by the light-emitting component 190. The second reflector 134 receives a light reflected by the first reflector 132 and reflects the light reflected by the first reflector 132 to an object (not shown in figures). The light-receiving lens 136 collects a light reflected by the object. The image sensor 138 detects a light collected by the light-receiving lens 136.

In the aforementioned configuration, the light-emitting component 190 is disposed in the stationary base 110. Therefore, when the rotating base 120 is rotating, the light-emitting component 190 does not rotate. Consequently, the light-emitting component 190 can provide stable laser beam, such that the accuracy of the measurement is improved and that the measurable distance is increased. In addition, because the light-emitting component 190 is not disposed in the rotating base 120, the weight of the rotating base 120 is lessened, and the volume of the rotating base 120 is reduced. Therefore, the rotating base 120 becomes easier to rotate.

Specifically, the light-emitting component 190 is a collimated beam laser module. People having ordinary skill in the art can make proper modifications to the light-emitting component 190 depending on the actual application.

In particular, the rotating base 120 has a first rotation axis, which is the symmetry axis 107, and the light-emitting component 190 and the first reflector 132 are disposed on the first rotation axis. People having ordinary skill in the art can make proper modifications to the rotating base 120, the first reflector 132, and the light-emitting component 190 depending on the actual application.

In this embodiment, the symmetry axis 107 and the first rotation axis is the same axis. Embodiments of this disclosure are not limited thereto. other embodiments, the symmetry axis 107 and the first rotation axis may be different axes.

The first reflector 132 may take the first rotation axis as the rotation axis thereof, and the second reflector 134 has a second rotation axis 108 and is able to conduct an orientation adjustment by rotating about the second rotation axis 108. Specifically, the first rotation axis is perpendicular to the second rotation axis 108. People having ordinary skill in the art can make proper modifications to the first reflector 132 and the second reflector 134 depending on the actual application.

In particular, the rotating base 120 has a first through hole 122, and the stationary base 110 has a second through hole 112. The first through hole 122 and the second through hole 112 form a passage, such that the light emitted by the light-emitting component 190 passes the passage and reaches the first reflector 132. The rotating base 120 further has a third through hole 124 to form a passage, such that the light reflected by the first reflector 132 reaches the second reflector 134 by passing the passage. As shown in FIGS. 1 and 2, the rotating base 120 further has a fourth through hole 126 to form a passage, such that the light collected by the light-receiving lens 136 reaches the image sensor 138 by passing the passage (in order to depict the fourth through hole 126, the light-receiving lens 136, the image sensor 138 clearly, an upper part 128 of the rotating base 120 is not shown in FIG. 1).

As shown in FIGS. 2 and 3, after the light 200 is emitted by the light-emitting component 190, the light 200 reaches the first reflector 132 by sequentially passing the second through hole 112 and the first through hole 122. Then, the light 200 is reflected by the first reflector 132, and the reflected light 200 reaches the second reflector 134 by passing the third through hole 124. Then, after the light 200 is reflected by the second reflector 134, the light 200 leaves the rotating base 120.

Because the first reflector 132 and the second reflector 134 can be rotated to adjust the orientation thereof, the light 200 leaving the rotating base 120 can be easily adjusted to be located in the plane in which the optical axis 139 of the light-receiving lens 136 is located, such that an angle θ between the light 200 leaving the rotating base 120 and the optical axis 139 is fixed and that triangulation can be performed. When the light 200 is emitted to an object, the light 200 is reflected by the object to form a reflected light (not shown in figures). Then, after the reflected light passes the light-receiving lens 136, the reflected light is focused to the image sensor 138. Therefore, the image sensor 138 can detect an angle between the reflected light and the optical axis 139, so as to calculate the distance between the object and the symmetry axis 107 of the rotating base 120.

Embodiments of this disclosure are not limited thereto. In other embodiments, the distance between the object and the optical sensor 130 may be obtained by calculating the time difference between the leaving time the light leaves the rotating base 120 and the receiving time the optical sensor 130 receives the reflected light. In addition, the light-emitting component 190 may be disposed in the rotating base 120 to emit a light to an object, and the optical sensor 130 detects the light reflected by the object.

The rotating optical range finder 100 further includes a rotating module (not shown in figures). The rotating module, such as a motor, is disposed in the rotating base 120 to drive the rotating base 120 to rotate. Embodiments of this disclosure are not limited thereto. In other embodiments, the rotating module can be disposed in the stationary base 110. For example, the rotating module is a motor to drive a rubber band, and the rubber band is sleeved on the periphery of the rotating base 120, such that the rubber band drives the rotating base 120 to rotate.

The rotating optical range finder 100 is continuously rotating when the distances between the optical range finder 100 and the surroundings are measured. By performing wireless power transfer by the first induction coil 160 and the second induction coil 170, no other electric power transfer component, such as a slip ring, is needed to be disposed between the stationary base 110 and the rotating base 120. Therefore, the weight of the rotating base 120 is lessened, and the volume of the rotating base 120 is reduced. Moreover, because there is no physical component disposed between the stationary base 110 and the rotating base 120 to perform electric power transfer, fractions between the stationary base 110 and the rotating base 120 is lessened. Therefore the rotating base 120 becomes easier to rotate.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. § 112, 6th paragraph. In particular, the use of "step of" in the claims herein is not intended to invoke the provisions of 35 U.S.C. § 112, 6th paragraph.

What is claimed is:

1. A rotating optical range finder, comprising:
    a stationary base;
    a rotating base disposed on the stationary base;
    an optical sensor disposed in the rotating base;
    a transmitting circuit disposed in the stationary base;
    a receiving circuit disposed in the rotating base and electrically connected to the optical sensor;
    a first induction coil disposed in the stationary base and electrically connected to the transmitting circuit; and
    a second induction coil disposed in the rotating base and electrically connected to the receiving circuit, wherein the first induction coil and the second induction coil have a same symmetry axis.

2. The rotating optical range finder of claim 1, wherein the first induction coil and the second induction coil perform wireless power transfer.

3. The rotating optical range finder of claim 1, wherein the first induction coil and the second induction coil perform wireless power transfer by magnetically coupled resonance.

4. The rotating optical range finder of claim 1, wherein the first induction coil and the second induction coil perform wireless signal transfer.

5. The rotating optical range finder of claim 1, wherein a ratio of a radius of the first induction coil to a radius of the second induction coil is from about 1 to about 2.

6. The rotating optical range finder of claim 1, wherein the first induction coil and the second induction coil have a gap disposed therebetween, and the gap is less than a radius of a smallest inscribed circle of the first induction coil or the second induction coil.

7. The rotating optical range finder of claim 1, further comprising a light-emitting component disposed in the stationary base, and wherein the optical sensor comprises:
    a first reflector for receiving and reflecting a light emitted by the light-emitting component;
    a second reflector for receiving a light reflected by the first reflector and reflecting the light reflected by the first reflector to an object;
    a light-receiving lens for collecting a light reflected by the object; and
    an image sensor for detecting a light collected by the light-receiving lens.

8. The rotating optical range finder of claim 7, wherein the light-emitting component is a collimated beam laser module.

9. The rotating optical range finder of claim 7, wherein the rotating base has a first rotation axis, and the light-emitting component and the first reflector are disposed on the first rotation axis.

10. The rotating optical range finder of claim 9, wherein the first reflector rotates about the first rotation axis, and the second reflector has a second rotation axis and is configured to perform an orientation adjustment by rotating about the second rotation axis.

11. The rotating optical range finder of claim 10, wherein the first rotation axis is perpendicular to the second rotation axis.

12. The rotating optical range finder of claim 7, wherein the rotating base has a first through hole, the stationary base has a second through hole, and the first through hole and the second through hole form a passage, such that a light emitted by the light-emitting component passes the passage and reaches the first reflector.

13. The rotating optical range finder of claim 1, further comprising a light-emitting component emitting a light to an object, wherein the light-emitting component is disposed in the rotating base, and the optical sensor detects a light reflected by the object.

14. The optical range finder of claim 1, further comprising a plurality of optical data transmission devices in both the rotating base and the stationary base performing wireless signal transfer between the rotating base and the stationary base.

* * * * *